Oct. 12, 1965   J. R. DOZIER   3,211,121
SHIP POSITIONING SYSTEM
Filed Oct. 29, 1963

INVENTOR:
J. R. DOZIER
BY: *Theodore E. Bieber*
HIS ATTORNEY

United States Patent Office 3,211,121
Patented Oct. 12, 1965

3,211,121
SHIP POSITIONING SYSTEM
James Ronald Dozier, Whittier, Calif., assignor to Shell Oil Company, New York, N.Y., a corporation of Delaware
Filed Oct. 29, 1963, Ser. No. 319,763
5 Claims. (Cl. 114—144)

This invention pertains to control systems and more particularly to a control system designed to control the operation of a plurality of propulsion units disposed on a marine vessel whereby the vessel may be maintained in a desired position.

Many marine vessels, for example, offshore drilling vessels and survey vessels, are required to be maintained over a fixed position or travel along a fixed course. In the past, various systems have been devised for maintaining the vessel in its desired position. For example, marine drilling vessels have been maintained in their desired position by means of a plurality of mooring lines attached to suitable anchors. The mooring lines are adjusted to maintain the vessel in its desired position. A second system utilized for floating marine drilling vessels depends on the positioning of a plurality of outboard propulsion units to generate a net thrust that maintains a vessel in its desired position. A system for controlling a plurality of outboard propulsion units to maintain a floating vessel dynamically positioned is described and claimed in a copending application of Howard L. Shatto, Jr. and James Ronald Dozier, entitled "Ship Control," Serial No. 95,601, filed March 14, 1961.

While the above systems are satisfactory, they have detracting features. A system depending upon mooring lines and anchors is limited to rather shallow depths adjacent the shoreline. The system that utilizes controllable outboard motors to maintain the vessel dynamically positioned while suitable for any depth of water is relatively expensive to construct. The outboard motor type drive units in the sizes required for positioning large drilling vessels are expensive and complicated. Also, the control system requires the resolution of a plurality of vectors to properly control the outboard propulsion units. Both of these factors lead to considerable expense in constructing such a system.

Further, the system utilizing outboard propulsion units has a slow response as a result of the time required to turn the outboard propulsion unit. Likewise the need for vectorially combining the various displacement signals to obtain suitable signals for controlling the propulsion units increases the complexity of the control system thus decreasing its reliability.

Accordingly it is the principle object of this invention to provide a system for positioning a marine vessel that utilizes a plurality of propulsion units having fixed axes with the magnitude and direction of thrust from each of the propulsion units being controlled to maintain the vessel dynamically positioned.

A further object of this invention is to provide a positioning system for a floating marine vessel in which fixed axis propulsion units are positioned on the vessel to generate a thrust along the longitudinal axis of the vessel and both a thrust and a turning couple along the athwartship axis of the vessel. The magnitude of thrust and direction of thrust from each of the propulsion units is then controlled to maintain the vessel in the desired position.

A further object of this invention is to provide a positioning system for a floating marine vessel in which the normal propulsion unit of the vesssel is utilized to supply thrust along the longitudinal axis and two additional fixed axis propellers are positioned on the vessel to generate thrust along the athwartship axis. In addition, the two additional propulsion units are controlled to generate a couple to turn the vessel about its center of rotation. All of the propulsion units are controlled both as to the magnitude of the thrust generated as well as thrust direction to maintain the vessel in a desired position.

The above objects and advantages of this invention are achieved by providing a floating marine vessel with a plurality of propulsion units, at least one of the propulsion units being positioned to generate thrust along the longitudinal axis of the vessel while at least two additional propulsion units are positioned to generate thrust along the athwartship axis of the vessel. The two additional propulsion units are also disposed to generate a couple to rotate the vessel about its center of rotation. The normal propulsion means of the vessel may be utilized to generate thrust along the longitudinal axis of the vessel since its axis is parallel with the longitudinal axis of the vessel. Of course, if the normal propulsion means is utilized it must be of a design that is capable of varying the magnitude of thrust from zero to a maximum amplitude and reversing the direction of the thrust. On a normal vessel this may be accomplished by varying the speed of rotation of the propeller and its direction of rotation. The two additional thrust units are positioned with their axis parallel to the athwartships axis of the vessel and spaced from the center of rotation of the vessel. Normally, these two additional propulsion units will be placed adjacent the bow and the stern of the vessel. The additional propulsion units are also designed to vary the amount of thrust generated as well as its direction.

The position of the vessel is determined by a suitable means, for example, a tiltmeter that measures the angular deflection of a taut line extending from the vessel to an anchored position bearing a known relationship to the desired position of the vessel. Similarly, various electronic positioning devices such as Shoran or Loran may also be used. The position of the vessel is then converted to displacement signals that coincide with the longitudinal and athwartship axis of the vessel. These signals are then compared with the desired position of the vessel along the longitudinal and the athwartship axis and correction signals related to the differences are generated. These correction signals are then used to control the propulsion means aligned with the longitudinal axis of the vessel and the propulsion means aligned with the athwartship axis of the vessel, respectively. In addition, the heading or yaw direction of the vessel is also detected and a signal related to its heading generated. This signal is then compared with a signal representing the desired heading or yaw direction of the vessel and a correction signal representing the difference between the two generated. The yaw correcting signal is added to the athwartship signal for one athwartship propulsion unit and subtracted from the athwartship signal for the second athwartship propulsion unit. One of the combined athwartship and yaw correcting signals is used to control one of the athwartship axis propulsion means while the other combined athwartship and yaw signal is used to control the second athwartship axis propulsion means.

The above objects and advantages of this invention will be more easily understood by those skilled in the art from the following detailed description of a preferred embodiment when taken in conjunction with the attached drawings in which.

Figure 1:
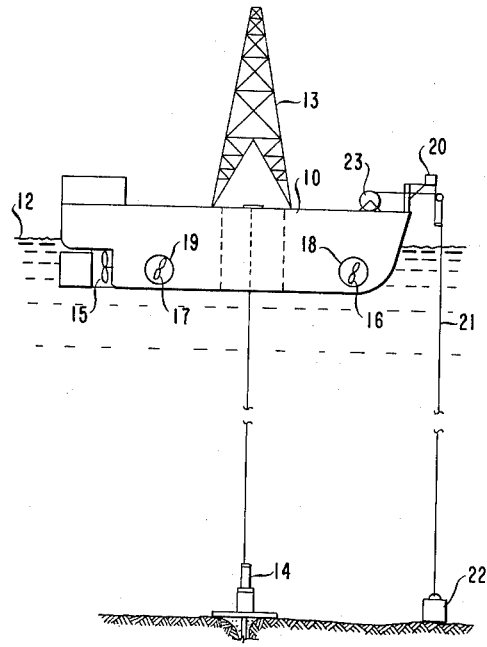
FIGURE 1 is an elevation view of a floating vessel showing the surge and sway axis propulsion means installed thereon.

Referring now to FIGURE 1, there is shown a floating marine vessel 10 on the surface of a body of water 12. The vessel, illustrated is a floating marine drilling vessel having a drilling rig 13 positioned thereon. In a drilling vessel, of course, the drill rig, must be maintained over the submerged wellhead 14 located on the bottom of the body of water 12. While the vessel 10 is illustrated as being a floating drilling vessel, obviously other types of vessels may also be positioned by the system of this invention. For example, a survey vessel that must be maintained over a fixed location or a vessel that must travel a fixed course could also be positioned by the system of this invention.

Vessel 10 is provided with a normal propulsion unit having a propeller 15 located adjacent the stern of the vessel. The propeller 15 would normally be located on the center line of the vessel to provide a thrust along the surge or longitudinal axis of the vessel 10. For the purpose of this invention, the main propulsion unit of the vessel 10 should be of the design that permits rapid changes in the speed of rotation of the propeller 15 as well as the reversal of the direction of rotation. Various types of propulsion units have these characteristics, for example, electric drive propulsion units. For example, if the propeller 15 is driven by a direct current motor the speed of rotation as well as the direction of rotation may be easily controlled by controlling the excitation of the field of the motor.

Vessel 10 is also provided with two additional propulsion means 16 and 17 having fixed axes that are aligned with the athwartships axis of the vessel 10. The propulsion unit 16 is located near the bow of the vessel 10 while the propulsion unit 17 is located near the stern of the vessel 10. Both the propulsion units 16 and 17 are shown as being positioned in circular openings 18 and 19 formed in the hull of the vessel 10. The circular openings project through both sides of the hull and thus permit the propulsion means 16 and 17 to exert a thrust in either direction merely by reversing the direction of rotation of the propellers 16 and 17. The propulsion units 16 and 17 are also preferably driven by a motor means whose speed may be readily changed and whose direction of rotation may also be changed. The motor means for the propulsion means 16 and 17 may be various electric drives having means for controlling the speed of rotation as well as the direction of rotation. While the propulsion means 16 and 17 are located within the hull of the vessel 10 they may also extend below the bottom of the hull of the vessel 10. The only requirement for the propulsion means 16 and 17 is that they have a fixed axis and that this axis being aligned with the athwartship axis of the vessel 10. Also, while propellers have been shown as propulsion means 15, 16 and 17, other devices as, for example, hydraulic jets may also be used. The system of this invention does not require that the azimuthal direction of the thrust be changed but only that the direction of the thrust be reversable along the rotation axis of the propeller. Thus, propellers rotating about a fixed axis are ideally suited for the propulsion means of this invention providing their direction of rotation can be reversed.

The position of the vessel 10 is measured or detected by means of a tiltmeter 20 that measures the angular deflection of a line 21. The line 21 extends from the vessel 10 to an anchor 22 that is located in a known position with respect to the underwater wellhead 14. The line 21 is secured to a winch means 23 located on the vessel 10. The winch 23 should be of a design that is capable of maintaining a constant tension on the line 21 thus maintaining the line in a taut condition. This type of position determining means is more fully described and claimed in copending application of Kenneth W. Foster, entitled "Position Locating Device," Serial No. 830,604, filed August 30, 1959, now Patent No. 3,121,954.

Figure 2:
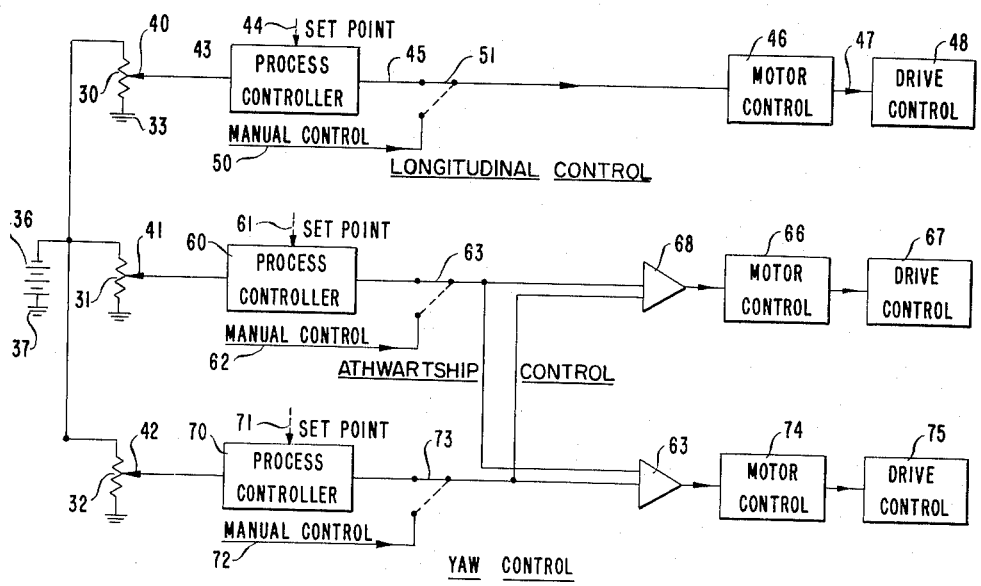
FIGURE 2 is a circuit diagram in block form of one control system for controlling the propulsion means shown in FIGURE 1; and, FIGURE 3 is a curve showing the linear relationship between the voltage signal generated by the propulsion control means and the thrust applied by the rotation of the propellers.

Reference is now made to FIGURE 2 showing in block diagram form a system for controlling the propulsion means 15, 16 and 17 shown in FIGURE 1. The circuit shown in FIGURE 2 uses a plurality of process controllers. These controllers should have gain rate and integral action and supply an output signal related to the difference between two input signals. Further, the controllers should be four quadrant type amplifiers since they will provide both positive and negative output signals depending upon the plurality and the magnitude of the input signals.

The movement of the vessel 10 in FIGURE 1 along the longitudinal axis is detected by a longitudinal transducer 30. The longitudinal transducer 30 is illustrated as being a potentiometer having one end grounded at 33 and the other end of the potentiometer coupled to the positive side of a battery 36. The negative side of the battery 36 is grounded at 37. The movable arm 40 of the potentiometer 30 is normally controlled by a pendulum in order that the potentiometer 30 will accurately reflect the angular deflection of the line 21 of FIGURE 1 along the longitudinal axis of the vessel 10. This type of a position sensing tiltmeter is described in the copending application of Kenneth W. Foster referred to above. The displacement of the line 21 along the athwartship axis is detected by a potentiometer 31 whose movable arm 41 may be controlled by the same pendulum that controls the arm 40 of the potentiometer 30. The heading or yaw direction of the vessel is also illustrated as being detected by a potentiometer 32. The movable arm 42 of the yaw transducer may be controlled by a gyro compass or other device capable of detecting the heating of the vessel. In place of the transducer 30 other types of electrical signals may be generated that reflect or indicate the heading of the vessel 10. Of course, if other types of signals are used it may be necessary to slightly modify the remainder of the control circuits to accept the signals.

The longitudinal transducer or potentiometer 30 is coupled to a process controller 43. The process controller 43 also receives a signal 44 that represents the desired position of the vessel along the longitudinal axis. The signal 44 is applied to the controller at the set point of the controller. The controller supplies a signal at the terminal 45 related to the difference between the actual position represented by the signal from the potentiometer 30 and the desired position represented by the set point 44. The process controller 43 should have a reset action to control the time response of the process controller in correcting for differences between the two input signals. The terminal 45 is coupled to a motor control 46 with the motor control being coupled by a lead 47 to a main propulsion motor 48. The motor control is designed to accept the signal from the process controller 43 and control the main propulsion motor 48 to generate a net thrust directly related to the signal received from the process controller 43. The design of the motor control 46 will depend upon the type of drive motor 48 used for driving the propulsion unit 15. When direct current motors are used for driving the propulsion units the motor control 46 can be of a type which controls the excitation current supplied to the field winding of the drive motor 48. In addition to controlling the magnitude of the current supplied, the motor control 46 should also control the polarity of the current. The output from the process controller 43 can be either positive or negative output signals depending upon the polarity of the input signals. Thus, the output signal from the process controller 43 can be adjusted to have the same polarity as the required excitation current for the drive motor 48. In addition, the motor control 46 is provided with an input 50, the input 50 representing a manual control of the propulsion unit 15. The manual control input 50 would permit the manual control of the propulsion unit and of course would require that the process controller 43 be disconnected as by a switch 51.

From the above described system for controlling the surge propulsion unit 15 it is seen that the signal representing the location of the vessel 10 along the longitudinal axis is first compared with the desired position of the vessel 10 along the longitudinal axis of the vessel by the process controller 43 to generate a longitudinal correcting signal. Thus, the longitudinal correcting signal is generated completely independent of the circuit used for controlling the drive motor. Similarly, the process controller 43 includes rate and reset actions to provide a responsive system that is free of oscillations.

The transducer 31 measures the displacement of the vessel 10 along the athwartship axis of the vessel. The movable arm 41 of the athwartship potentiometer 31 is coupled to a process controller 60. The process controller 60 is also provided with a signal 61 representing the desired position of the vessel 10 along the athwartship axis of the vessel. The process controller 60 compares the signal from the potentiometer 31 with the signal 61 and generates a suitable athwartship correcting signal. The process controller 60 is coupled to two operational amplifiers 62 and 63. The yaw potentiometer 32 is coupled to a process controller 70. The process controller 70 also receives a setpoint signal 71 representing the desired heading or yaw direction of the vessel 10 shown in FIGURE 1. The process controller 70 is coupled to the two operational amplifiers 68 and 63. The operational amplifier 68 is designed to provide an output signal representing the difference between the signals from the process controller 60 and the process controller 70, while the operational amplifier 63 provides an output signal representing the sum of the signals from the process controllers 60 and 70. The operational amplifier 68 is coupled to the motor control circuit 66 with the motor control circuit being coupled to the drive motor 67. The drive motor 67 is a propulsion drive unit for the bow propulsion unit 16 shown in FIGURE 1. An input signal 62 representing the manual athwartship control of the propulsion units 16 and 17 is provided. When manual athwartship control is used the process controller 60 is disconnected as by a switch 63. The bow propulsion control unit described above is similar in its control and operation to the longitudinal propulsion control unit described above.

The operational amplifier 63 is coupled to a motor control circuit 74 with the motor control circuit being coupled to a drive motor 75. The drive motor 75 is a drive motor for the stern propulsion unit 17 shown in FIGURE 1. An input signal 72 representing the manual yaw control of the propulsion units 16 and 17 is provided. When manual yaw control is used, the process controller 70 is disconnected as by a switch 73. The stern propulsion control unit operates in the same manner as described above for the surge propulsion control unit. It should be noted that the manual sway and yaw control signals 62 and 72 are supplied to the operational amplifiers 68 and 63. This provides a means whereby manual control of sway and yaw may be achieved without resulting to mental vector additions.

Figure 3:
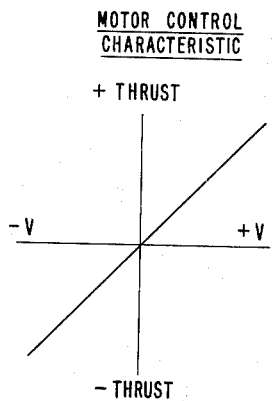

The above described control units, and more particularly, the process controllers 50, 65 and 73 provide output signals that are either a negative or positive voltage with the polarity of the signal representing the direction in which the propulsion drive motor must rotate while its magnitude idicates the speed at which the motor must rotate. Thus, it is a simple matter to use the output signal of the process controllers to position a motor control unit to control the energizing current supplied to the field coils of the drive motors. As explained above, if direct current motors are used for the drive motors one can control both the speed and direction of rotation of the drive motors by controlling the field excitation currents. The relationship between the voltage output signal from the operational amplifiers and the speed and direction of rotation of the drive motors is shown in FIGURE 3. In this figure the minus r.p.m. indicates rotation in one direction while plus r.p.m. indicates the opposite direction of rotation. As seen from FIGURE 3, the relationship between the voltage output signals of the process controller and the speed of rotation of the drive motors is substantially a linear relationship. Thus, the control system of this invention provides a smooth control that can go from a maximum thrust in one direction to zero thrust to a maximum thrust in the opposite direction without interruption and in a minimum of time.

I claim as my invention:

1. A system for positioning a marine vessel comprising:
    a plurality of fixed propulsion units mounted on said vessel, at least two of said propulsion units being disposed to propel said vessel along its athwartship axis and mounted away from the center of rotation of the vessel to provide a rotational couple about the center of rotation, at least one additional propulsion unit disposed to propel said vessel along its longitudinal axis;
    a position sensing means disposed on the vessel and adapted to measure the displacement of the vessel from its desired position in two planes at an angle to each other and convert the measured displacements to related quantities along the longitudinal and athwartship axes of the vessel;
    a controller for the longitudinal axis, said longitudinal controller being coupled to said position sensing means to compare the quantity representing the displacement along the longitudinal axis with a set value and supply a longitudinal correcting signal;
    a longitudinal propulsion controlling means, said longitudinal propulsion controlling means being coupled to both said longitudinal controller and said one additional propulsion unit to control said one additional propulsion unit in response to said longitudinal correcting signal;
    a controller for the athwartship axis, said athwartship controller being coupled to said position sensing means to compare the quantity representing the displacement along the athwartship axis with a set value and supply a athwartship correcting signal;
    a yaw sensing means disposed on the vessel and adapted to measure the heading of the vessel and converting the measured yaw to a related quantity;
    a controller for the yaw axis, said yaw controller being coupled to said yaw sensing means to compare the quantity representing the measured yaw with a set value and supply a yaw correcting signal;
    a first summing means, said first summing means being coupled to both said athwartship and yaw controllers and adapted to add said athwartship and yaw correcting signals and supply a first combined athwartship and yaw correcting signal;
    a second summing means, said second summing means being coupled to both said athwartship and yaw controllers and adapted to subtract said yaw correcting signal from said athwartship correcting signal and supply a second combined athwartship and yaw correcting signal;
    a first athwartship propulsion controlling means, said first athwartship propulsion controlling means being coupled to both said first summing means and one of said two propulsion units to control said one propulsion unit in response to said first combined athwartship and yaw correcting signal; and
    a second athwartship propulsion controlling means, said second athwartship propulsion controlling means being coupled to both said second summing means and the second of said two propulsion units to control said second propulsion unit in response to said second combined athwartship and yaw correcting signal.

2. The positioning system of claim 1 wherein said propulsion units are propeller type propulsion units that rotate about fixed axes, the speed of rotation and the direction of rotation being controllable.

3. The system of claim 1 in which the longitudinal propulsion unit is located adjacent the stern of the vessel and the axis of rotation of the longitudinal propulsion unit is aligned with the longitudinal axes thereof and the athwartship propulsion units are located adjacent the bow and stern of the vessel and the axes of rotation of the athwartship propulsion units are parallel to the athwartship axis of the vessel.

4. The system of claim 1 in which the position sensing means measures the displacement of the vessel from its desired position in two planes aligned with the longitudinal and athwartship axes of the vessel.

5. A method of positioning a marine vessel comprising:
    detecting position of the vessel relative to its desired position along the longitudinal, athwartship and yaw axes of the vessel;
    generating a first thrust parallel with the longitudinal axis of the vessel related to the difference between the detected position and desired position along the longitudinal axis;
    generating independent of said first thrust a second thrust along the athwartship axis at each of two positions, said positions being spaced from the center of rotation of the vessel, the total generated thrust along the athwartship axis being related to the difference between the detected position and the desired position along the athwartship axis; and
    utilizing the second thrusts to generate a thrust couple about the center of rotation of the vessel, said thrust couple being related to the difference between the detected yaw position of the vessel and the desired yaw position.

References Cited by the Examiner
UNITED STATES PATENTS

| | | | |
|---|---|---|---|
| 598,424 | 2/98 | Kuss | 114—148 |
| 3,096,046 | 7/63 | Kendall et al. | 244—17.13 |
| 3,105,453 | 10/63 | Hayes | 114—144 |
| 3,117,749 | 1/64 | Angel | 244—17.17 |

MILTON BUCHLER, *Primary Examiner.*

ANDREW H. FARRELL, *Examiner.*